Sept. 5, 1933.                C. R. PATON                1,925,278
                                CLUTCH
                        Filed Sept. 20, 1929       2 Sheets-Sheet 1

INVENTOR.
Clyde R Paton
BY
ATTORNEY

Sept. 5, 1933.   C. R. PATON   1,925,278
CLUTCH
Filed Sept. 20, 1929   2 Sheets-Sheet 2

INVENTOR.
Clyde R Paton
BY
P. W. Pomeroy
ATTORNEY

Patented Sept. 5, 1933

1,925,278

UNITED STATES PATENT OFFICE 1,925,278

CLUTCH

Clyde R. Paton, South Bend, Ind., assignor to The Studebaker Corporation, South Bend, Ind., a corporation of New Jersey Application September 20, 1929
Serial No. 394,013

7 Claims. (Cl. 192—68)

This invention relates to vehicle clutches and particularly to means provided therein for preventing engine vibrations from being transmitted to the vehicle transmission.

The principal object of the invention is to provide a vehicle clutch with a resilient driving connection between the clutch plate and the clutch hub to absorb torsional vibrations existing in the driving members, further means being provided to dampen the torsional movement between the clutch hub and the driving plate therefor.

Another object is to provide a vehicle clutch with a resilient member between the clutch plate and clutch hub whereby engine vibrations and noises are prevented from being transmitted to the vehicle transmission and to insure smoother operation and longer life of the latter.

A further object is to provide a vehicle clutch with a resilient member between the clutch plate and the driven hub thereof to form a resilient driving connection, adjustable tensioning means being also provided to regulate the amount of friction between the resilient member and plate for regulating the torsional movement of the plate relative to the hub.

A still further object is to provide a vehicle clutch with a resilient member bonded to the clutch hub and the clutch plate and held in operative position therewith by tensioning means surrounding the clutch hub to thus provide a resilient driving connection whereby engine vibrations and noises are absorbed and are not transmitted to the vehicle transmission.

These being among the objects of the present invention, the same consists of certain features of construction and combination of parts to be hereinafter described with reference to the accompanying drawings, and then claimed, having the above and other objects in view.

In the accompanying drawings which illustrate a suitable embodiment of the present invention and in which like numerals refer to like parts throughout the several views, Figure 1 is a longitudinal sectional view of the vehicle clutch embodying my invention, certain parts being shown in full lines and parts of the engine and transmission in dotted lines to more fully illustrate the invention.

Figure 1:
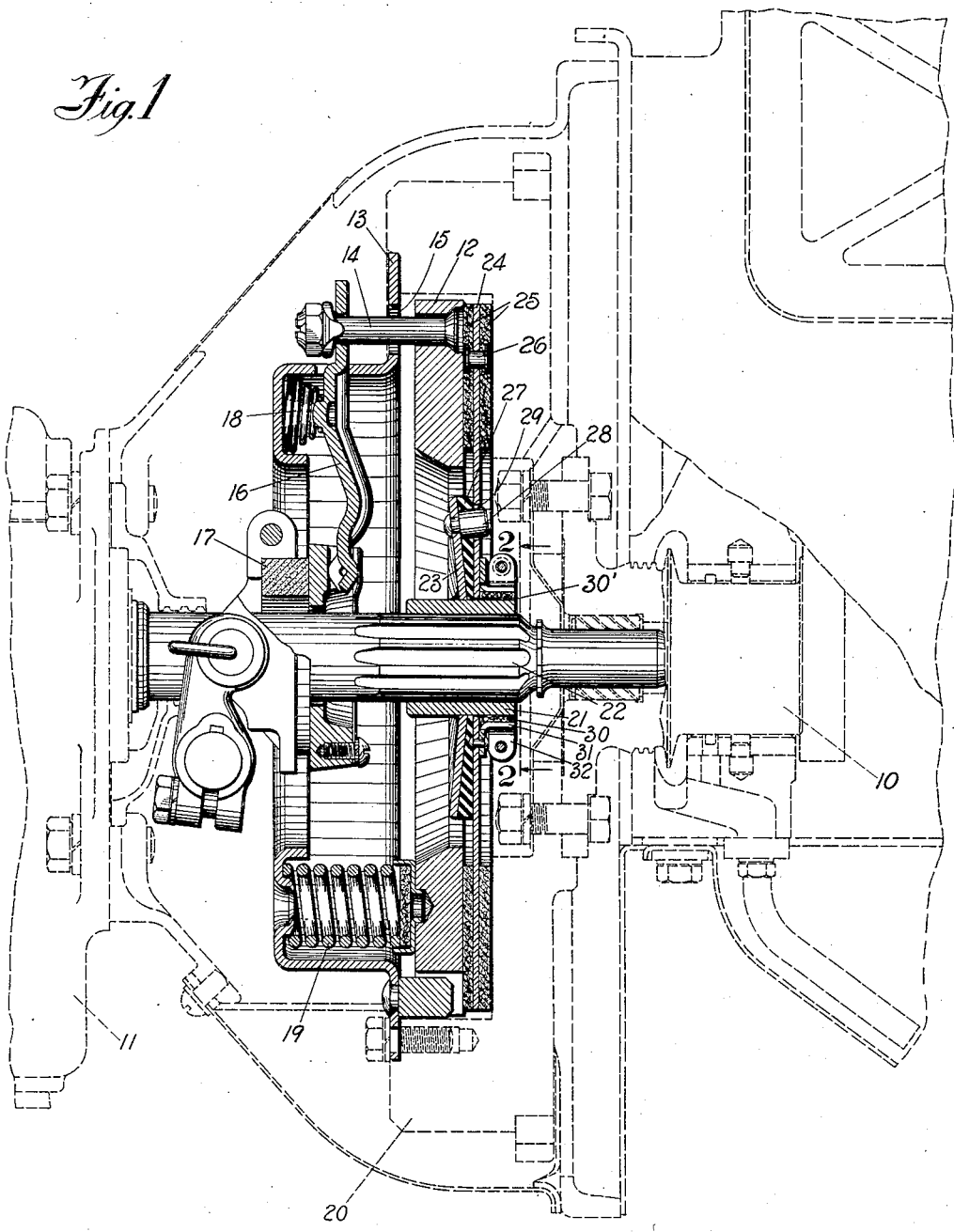

In the type of clutch illustrated in the drawings, driving torque is transmitted from the engine crank shaft 10 to the vehicle transmission 11 by means of the clutch comprising a pressure plate 12, a cover plate 13, releasing pins 14 mounted in the pressure plate 12 extending through openings 15 in the cover plate 13, releasing levers 16 fulcrumed on the cover plate, engaging the releasing pins 14 at their outer ends and at their inner ends engaging with a shifting collar 17 maintained in operative engagement therewith by means of the springs 18 positioned between the cover plate 13 and the levers 16, and coil springs 19 interposed between the cover plate 13 and the pressure plate 12 tending to force the pressure plate 12 against the fly wheel 20 of the engine. The clutch hub 21 splined on to the end of the driven shaft 22 is provided with a flange 23 which may be welded or otherwise secured thereto or formed as an integral part therewith for a purpose to be hereinafter described.

The clutch construction heretofore described is for the purpose of illustration only and in detail forms no part of my invention except in so far as it is adaptable for use with my invention. In the type of clutch illustrated, driving torque is transmitted from the engine crank shaft 10 by means of a single clutch plate 24 positioned between the engine fly wheel 20 and the pressure plate 12 which are brought together by the pressure exerted by the springs 19 to drive the plate 24 by their frictional engagement with the clutch plate facings 25 secured to the opposite sides of the plate 24 by a plurality of rivets 26.

A resilient driving connection is developed in the present invention by means of a circular resilient disk 27 of yieldable friction material having suitable hysteresis preferably formed of rubber, however, other suitable materials capable of performing the purpose specified may be substituted, and the invention is not limited to the use of rubber for the purpose specified. It is desirable to limit the degree of torsional movement between the clutch hub 21 and the driven plate 24 and stops 28 secured to the clutch hub flange 23 are provided which extend through the resilient disk 27 and into openings 29 formed in the clutch plate 24. The openings 29 in the clutch plate 24 are preferably of a larger diameter than the stops 28 to permit a slight rotative movement of the clutch plate 24 relative to the clutch hub flange 23, the amount of movement being determined by the relative sizes of the stops 28 and the openings 29.

The amount of friction between the clutch plate 24 and the clutch hub 21 may be regulated by a tensioning device including a suitable bushing 30 formed of frictional non-yieldable material, either metallic or non-metallic, having a resilient facing 30' as, for example, relatively soft rubber positioned between and bonded to the outer face of the clutch hub 21 and the inner surface of the bushing 30 and a resilient friction ring 31 which has a flange portion suitably secured to the clutch plate 24 and axially disposed lugs or tongues overlying the outer surface of the bushing 30. The frictional resistance between the ring 31 and the bushing 30 is controlled by the semi-circular members 32 having ears 33 thereon through which extend bolts 34 having coiled compression springs 35 thereon interposed between the heads of the bolts 34 and the respective ears 33 formed on the semi-circular members 32, the resistance between the clutch hub 21 and the clutch plate 24 being regulated by means of the nuts 36. By adjusting the nuts 36 on the bolts 34 the compression of the springs 35 is regulated to establish the proper pressure between the ring 31 and the outer surface of the bushing 30 whereby a predetermined amount of friction opposing the relative movement between the clutch plate 24 and clutch hub 21 may be had. The bushing 30 is preferably of a non-yielding material having a resilient facing 30' between the inner face thereof and the clutch hub 21 to permit a limited relative rotational motion of the clutch plate and clutch hub before the dampening action of the ring 31 on the bushing 30 becomes effective. The clutch plate 24 is permitted to move torsionally relative to the clutch hub 21 in response to torsional forces thus creating damping therefor due to the hysteresis of the resilient disk 27. Due to the resilient facing 30' on the bushing 30 which preferably has greater hysteresis than the resilient disk 27, the disk 27 functions to permit low torsional damping for small torsional forces before the tensioning means functions in the dampening means for large torsional forces. The bushing 30 does, therefore, permit of low torsional damping for small torsional forces because of the relatively high hysteresis of its facing 30' and the bushing 30 also functions as a dampening means for the greater torsional forces due to the frictionally resisted slippage which occurs between the bushing 30 and the ring 31.

Referring to Figure 1 of the drawings, it will be noted that the clutch hub flange 23 is inclined relative to the clutch plate 24 and that the resilient member 27 is formed to fill the space between these respective members and is bonded thereto. Although the clutch hub flange 23 and the clutch plate 24 may be substantially parallel, I prefer to incline the former at an angle such that the thickness of the resilient member at any point is proportional to the radial distance from the point to the center of the member, so as to permit the member 27 to have an increasingly greater sectional area from its inner edge to its periphery so that I am enabled to obtain a uniform distortion per unit of thickness and therefore a uniform stress on the bond between the clutch plate 24 and the flange 23 and the resilient member 27 whereby the entire working face of the same will be uniformly effective for successfully damping the torsional vibrations transmitted to the clutch plate 24 by the driving members.

Figure 2:
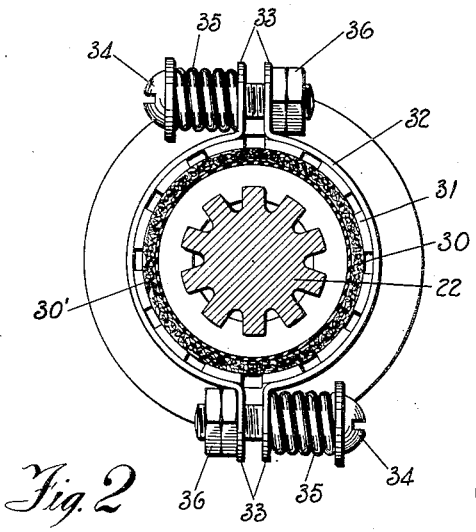
Figure 2 is a sectional view taken substantially on the line 2—2 of Figure 1.
Figure 3:
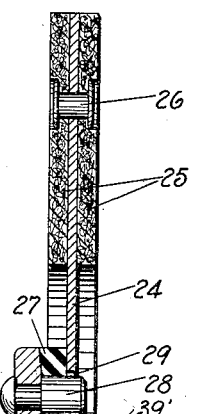
Figure 3 is a longitudinal sectional view, similar to Figure 1, showing a modification of the invention.
Figure 4:
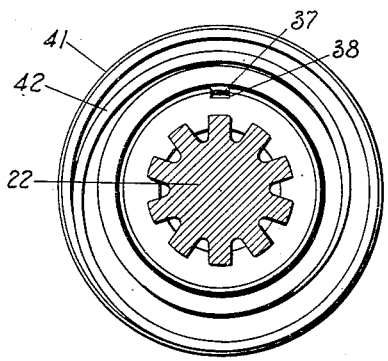
Figure 4 is a sectional view taken substantially on the line 4—4 of Figure 3.

Referring to Figures 3 and 4 of the drawings, I have shown the driven shaft 22 on which is splined the clutch hub 21 having a flange 23' integral thereon. The clutch plate 24 having the friction disks 25 on either side thereof and secured thereto by means of the rivets 26 is mounted in the same manner as in the construction shown in Figures 1 and 2 and has the resilient member 27 bonded between the plate 24 and the clutch hub flange 23' in the same manner and for the same purpose as in Figure 1. Stops 28 riveted to the clutch hub flange 23' extend through the resilient member 27 and into openings 29 formed in the clutch plate 24. I have, however, provided a slightly different frictional means for opposing relative movement between the clutch plate 24 and hub 21 which comprises a disk 40 riveted to the clutch plate 24, and a second disk 41 mounted on the clutch hub 21 having an ear 37 extending into a key-slot 38 formed in the clutch hub 21 to prevent rotational movement of the disk 41 relative to the hub.

A non-yieldable friction disk 39 formed either of metallic or non-metallic material having a resilient facing 39' as, for example, relatively soft rubber preferably bonded thereto, is positioned between the disks 40 and 41. A coil spring 42 positioned between the disk 41 and a ring 43 seated in an annular slot 44 formed in the clutch hub 21 is always under compression so that the disk 41 tends to press against the friction disk 39 whereby the necessary friction is provided to damped the torsional movement between the plate 24 and hub 21. The disk 39, like the bushing 30, is preferably formed of a non-yielding material and may have a resilient facing 39' whereby the clutch plate 24 is permitted to move torsionally in response to low torsional forces creating damping therefor due to the hysteresis of the member 27 before the disk 39 functions. The disk 39 having the facing 39', like the bushing 30, having the facing 30', provides low torsional damping for small torsional forces as well as large torsional damping for large torsional forces. In both constructions the facings being interposed between a relatively movable part and the friction disk act in series with the body portion of the friction means to accomplish the result just described. In some constructions it may be found desirable to omit the resilient facing 30' and 39' on the respective bushing 30 or disk 39 in which case the low torsional damping would be eliminated and only the damping for large torsional forces would be obtained.

Figure 5:
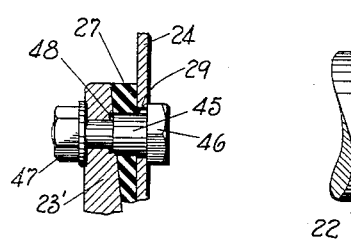
Figure 5 is a fragmentary sectional view showing a modified form of stop for limiting the torsional movement between the clutch plate and clutch hub.

In Figure 5, I have shown a modified form of stop for limiting the relative movement between the clutch plate 24 and the hub flange 23'. As shown, the stop 45 extends through the resilient member 27 and the opening 29 formed in the clutch plate 24 and is provided with a head 46 engaging with the face of the clutch plate 24. The stop 45 is provided with an adjusting nut 47 which can be tightened so that the large portion of the stop 45 will be drawn against the abutment 48 formed in the flange 23' to compress the resilient member 27 to thus provide a fixed compression of the same. The resilient member 27 as shown in Figure 5, is preferably bonded to the clutch plate 24 and the flange 23' the same as in the other constructions.

Figure 6:
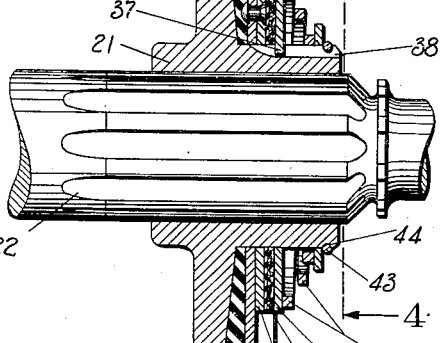
Figure 6 is a fragmentary sectional view showing a modified form of clutch plate.

In bonding the resilient member 27 to the clutch hub and clutch plate, it is oftentimes desirable to use as small members as possible and I have, therefore, shown in Figure 6 a clutch plate formed of two members joined together so that only one of these members need be put in the mold when bonding the resilient member 27 thereto. I have accordingly shown a clutch plate comprising an inner ring 49 having openings 50 therein to receive the stops 28 which can be inserted in the mold to have the resilient member 27 bonded thereto. The ring 49 may then be secured by rivets 51 or other suitable means to an outer clutch plate 52 adapted to carry suitable clutch facings adapted to function in the same manner as the clutch plate 24 shown in Figure 1 or 3.

The operation of the clutch will be apparent from the foregoing description and it will be seen that vibrations caused by sudden accelerations and decelerations of the engine or driving member are eliminated by the relative movements between the clutch plate 24 and the clutch hub 21, the openings 29 surrounding the stops 28 allowing this movement. The resilient member 27 permits of torsional movement between the clutch plate 24 and hub 21, the degree of movement being limited by the stops 28 which engage with the edge wall of the openings 29 formed in the clutch plate 24, it being apparent that the amount of torsional movement between the clutch plate 24 and hub 21 is controlled by the relative sizes of the pins 28 and the openings 29 in the clutch plate 24 through which the pins extend. By the use of the tensioning means which includes the frictional bushing 30, formed of non-yieldable material, which has a facing 30' of resilient material, the resilient disk 27 permits of small torsional damping for small torsional forces before the bushing 30 moves relative to the ring 31 due to the hysteresis of the facing 30' which permits of limited movement of the bushing 30 with the ring 31. The frictional resistance between the clutch plate 24 and the hub 21 is regulated by the adjusting nuts on the screws 34 having the springs 35 thereon so that the tension of the springs 35 may be adjusted to increase or decrease the friction between the clutch plate 24 and clutch hub 21 to thereby adjust or vary the torsional damping between these respective members. It will also be apparent that the above described friction means may be employed in any mechanism having a driving member and a driven member in which there is a relative movement between the respective members to damp out torsional vibrations in the same. It is, therefore, understood that I do not wish to be limited to the use of this torsional vibration damper in clutches, but instead it may be used in any driving mechanism having a relative movement between the driving and driven members.

The present invention operates both when the drive is from the engine to the rear axle and when it is from the rear axle to the engine. It is evident under normal driving conditions that the clutch plate prevents engine vibrations and sudden torque impulses from being transmitted to the transmission with the result that the life of the transmission is prolonged and that smoother operation of the same is obtained. The clutch plate is simple in its construction, easy to assemble and economical to manufacture.

Although preferred embodiments of the invention are shown in the drawings, it is to be understood that formal changes may be made in the specific embodiment of the invention described without departing from the spirit and substance of the broad invention the scope of which is commensurate with the appended claims.

What I claim is:

1. In a clutch, the combination of, a driving plate, a driven hub, a rubber member interposed between said plate and hub bonded thereto permitting torsional movement therebetween, and friction means including a resilient part opposing the relative tortional movement between said plate and hub.

2. In a clutch, the combination of, a driving plate, a driven hub, a rubber member interposed between said plate and hub bonded thereto permitting torsional movement therebetween, and a friction member comprising a non-yieldable part and a resilient part bonded to said non-yieldable part opposing the relative torsional movement between said plate and hub.

3. In a clutch, a driving member, a driven member, a resilient member having walls inclined with respect to each other diverging from the center to the periphery of said member at an angle corresponding to the angular distortion of said member at different distances from the center thereof bonded to said driving and driven members permitting torsional movement therebetween, and frictional means opposing the relative torsional movement between said driving and driven members.

4. In a clutch, a driving member, a driven member, a resilient member having its side walls inclined with respect to each other diverging uniformly from the center to the periphery of said member bonded to said driving and driven members permitting torsional movement therebetween, and friction means opposing the relative torsional movement between said driving and driven members.

5. In a clutch, a driving member, a driven member, a resilient member having walls inclined with respect to each other bonded to said driving and driven members permitting torsional movement therebetween, and a friction member comprising a non-yieldable part and a resilient part bonded together opposing the relative torsional movement between said driving and driven members.

6. In combination with the driving member and driven member of a driving mechanism, of a resilient member interposed between said driving and driven members and a friction member comprising a non-yieldable part and a resilient part bonded together also interposed between said driving and driven members for opposing relative movement therebetween due to distortion of said resilient member.

7. In combination with the driving member and driven member of a driving mechanism, of friction means for opposing the relative movement between said members comprising a friction member, having a non-yieldable part and a resilient facing engaging said driven member, a split ring secured to said driving member engaging the non-yieldable part of said friction member, and adjusting means for regulating the friction between said split ring and friction member.

CLYDE R. PATON.